United States Patent [19]

Sato

[11] Patent Number: 4,465,168
[45] Date of Patent: Aug. 14, 1984

[54] PRESSURE CONTROL SYSTEM FOR A TRANSMISSION

[75] Inventor: Masayuki Sato, Komatsu, Japan

[73] Assignee: Kabushiki Kaisha Komatsu Seisakusho, Tokyo, Japan

[21] Appl. No.: 325,013

[22] Filed: Nov. 25, 1981

[51] Int. Cl.³ .................. F16D 25/10; B60K 41/00
[52] U.S. Cl. .................. 192/3.57; 192/87.19; 192/109 F
[58] Field of Search ............ 192/3.57, 3.58, 0.08, 192/87.13, 87.18, 87.19, 87.15, 87.14, 109 F

[56] References Cited

U.S. PATENT DOCUMENTS 3,181,394  5/1965  Ramsel et al. .
3,618,424 11/1971  Golan et al. .
3,709,065  1/1973  Starling ......................... 74/753
3,722,646  3/1973  Oguma .................... 192/87.18 X
3,991,865 11/1976  Komatsu .................... 192/109 F
4,132,302  1/1979  Chatterjea ................. 192/3.57 X
4,219,109  8/1980  Ushijima et al. ............. 192/109 F
4,274,521  6/1981  Cadeddu ...................... 192/3.57
4,289,221  9/1981  Chambers et al. ............. 192/3.57

Primary Examiner—George H. Krizmanich
Attorney, Agent, or Firm—Armstrong, Nikaido, Marmelstein & Kubovcik

[57] ABSTRACT

A pressure control system for a transmission having a series of fluid-operated clutches which are engaged and disengaged through a selector valve to change drive ratios, has a valve for modulating the fluid pressures applied to the clutches to effect smooth shock free shifting. Basic control of the pressure at any of the clutches is effected by a modulation valve upstream of the selector valve. The modulation valve has an auxiliary chamber formed at one end thereof, a piston mounted therein and an auxiliary port connected to one of the clutches having a maximum filling time thereby shortening the filling time thereof without changing filling times of other clutches.

3 Claims, 5 Drawing Figures

PRESSURE CONTROL SYSTEM FOR A TRANSMISSION

BACKGROUND OF THE INVENTION

This invention relates to a pressure regulating valve for use in power shift transmissions.

The power shift transmission comprises plural rows of planet gears and is adapted to generate a power changed into a predetermined speed stage by selectively fixing each row of ring gears by means of a hydraulically actuated clutch.

In this type of power shift transmission, the arrangement is made such that the hydraulic pressure for actuating the clutch can be modulated as shown in FIG. 1 in order to relax the peak torque and the speed change shock which occur during the speed change stage. In FIG. 1, reference character $T_f$ is the filling time required to fill the clutch cylinder with oil; that is, a time lag during which no power transmission occurs and $T_b$ is the build-up time during which the clutch is gradually engaged from the semi-clutch condition. Reference character $P_f$ denotes the initial incoming fluid pressure into the clutch cylinder, $P_c$ the initial clutch pressure at the time of commencement of the pressure build-up, and $P_s$ the clutch operating pressure at the time of completion of the pressure build-up. In the build-up time $T_b$, the clutch is smoothly rendered operative so as to enable the relaxation of the peak torque and the reduction of the shock generating at the time of speed changes to be achieved.

As mentioned above, the conventional power shift transmission comprises a plurality of planet gear trains each having a clutch; however, each clutch has a different number and size of clutch disks, respectively, from the viewpoint of the durability thereof.

For this reason, the stroke and area of the pistons each slidably mounted within the respective hydraulic cylinders for urging the disks of the clutch are different. Therefore, each of the clutches has different cylinder volume and in some cases the largest clutch has a cylinder volume as about three times that of the smallest clutch. Further, each of the clutches has a different conduit frictional resistance between the respective cylinders and the modulation valves for modulating or gradually increasing the pressure of the fluid flowing into the cylinders. Further, all the volume delivered by the pump is not supplied into the clutch cylinder because part of the volume of the fluid is relieved through the modulation valve and so the filling time tends to increase.

For this reason, as shown in FIG. 2, even in a single power shift transmission, the filling time $T_{f1}$ and $T_{f2}$ differ by speed stages.

The large variations in filling time caused by speed changes will give an unpleasant feeling to the driver. Further, where the filling time is long and particularly when it is desired to accelerate the vehicle, the clutch remains disengaged even with the accelerator pedal being depressed during the filling time so that no load will be imposed on the engine during that time and therefore the engine will suddenly rotate very rapidly. Whilst, because no power is transmitted to the vehicle driven during this period, the speed of the vehicle is reduced due to the running resistance and the gradient resistance. Since the clutch commences engagement from this state, the clutch must absorb or take up an extra work due to the racing of the engine and the reduction in the vehicle speed, thus causing damage to the clutch. Further, such engagement of the clutch will cause sudden changes in the engine speed and also in the acceleration of the vehicle, and therefore the driver will experience great shocks. Further, in case where the speed of the vehicle is reduced so much due to a large filling time, the allowance torque for the acceleration becomes smaller in high speed stages and so the acceleration takes a longer time. If the filling time is long, when the vehicle is climbing a slope, it tends to slip down.

FIG. 3 shows how engine revolution and vehicle speed are changed in accordance with fluid pressure changes at clutches having different filling times. For a clutch having filling time $T_{f1}$ which is shorter than $T_{f2}$, the racing of the engine becomes small and the decrease of the vehicle speed becomes small, whilst for a clutch having filling time $T_{f2}$, the racing of the engine becomes large and the decrease of the vehicle speed becomes large. With large drop in the vehicle speed, it takes a longer time to accelerate the vehicle thereafter.

In such a case, it is required to take measures to reduce the filling time. One conventional solution to this problem is to reduce the amount of relief of the pressurized fluid from the modulation valve during filling operation and supply the fluid under pressure delivered by the pump effectively into the clutch cyliner.

For this purpose, it is only necessary to raise the initial clutch pressure $P_c$ of the modulation valve. However, if a speed change occurs between drive ratios having extremely different filling times as shown in FIG. 2, then a problem will occur which is mentioned below.

In brief, if the initial clutch pressure is increased from $P_c$ to $P_c'$ in order to reduce the filling time from $T_{f2}$ to $T_{f2}'$, then the shorter filling time $T_{f1}$ is reduced further, and therefore the fluid pressure begins to increase again while it has not lowered enough to its predetermined value thereby causing a poor modulation so that it becomes unable to obtain a proper modulation effect for relaxing the peak torque and reducing the shocks during speed changes.

SUMMARY OF THE INVENTION

It is therefore an object of the present invention to provide a pressure control system for a transmission including a plurality of fluid-actuated clutches which overcomes the above noted problems of the prior art.

Another object of the present invention is to provide an improved modulation valve for use in a pressure control system for a transmission including a plurality of fluid-actuated clutches wherein the modulation valve allows an increase in initial clutch pressure for a clutch having a maximum filling time thereby shortening the filling time thereof but leaves initial clutch pressures for other clutches unchanged whereby a relatively uniform filling time is obtained for any drive ratio.

In accordance with an aspect of the present invention, there is provided a pressure control system for a transmission including a plurality of fluid-actuated clutches which may be engaged and disengaged to obtain selected ones of a plurality of drive ratios, the pressure control system comprising: (a) a source of fluid under pressure; (b) a selector valve disposed between said source of fluid and said clutches for directing the fluid to selected ones thereof to shift between said drive ratios; (c) a modulation valve disposed at the flowpath between said source of fluid and said selector valve for modulating the pressure of fluid supplied to any of said clutches through said selector valve, said modulation valve comprising: a valve body having an axial bore formed therein, said valve body also having formed therein an inlet port connected with said source of fluid, a first outlet port connected with said clutches through said selector valve, a second outlet port and a back pressure port; a spool slidably mounted in said bore defining a first chamber at one end thereof, the first chamber being in constant communication with the inlet port; first biasing means for biasing said spool in a predetermined direction for establishing the communication between the inlet port and the second outlet port; second biasing means for biasing said spool in the opposite direction for blocking the communication between the inlet port and the second outlet port, said second biasing means being communicated with the back pressure port and operated by fluid introduced therethrough; a cover housing fitted to an end of said valve body opposite said spool, said cover housing having formed therein a second chamber and an auxiliary port connected with one of said clutches having a maximum fluid filling time and; a piston slidably mounted in said second chamber for biasing said second biasing means in the opposite direction when fluid is introduced into said second chamber through said auxiliary port; and (d) pilot-operated valve means disposed at the flow path between said modulation valve and said selector valve for introducing fluid into said back pressure port.

The above and other objects, features and advantages of the present invention will be readily apparent from the following description taken in conjunction with the accompanying drawings.

DESCRIPTION OF THE PREFERRED EMBODIMENT

The present invention will now be described in detail below with reference to FIG. 5.

Figure 1:
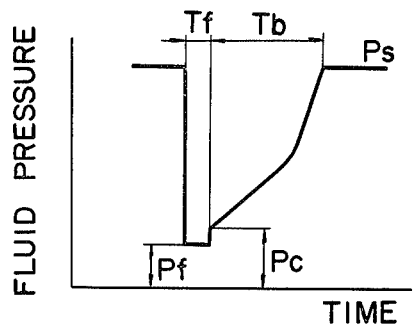
FIG. 1 is a diagram showing a relationship between fluid pressure at a clutch and time elapsed for engaging the clutch wherein $P_f$ denotes the initial incoming fluid pressure into a clutch cylinder, $P_c$ the initial clutch pressure, $P_s$ the clutch operating pressure after pressure build-up in the clutch cylinder has been completed, $T_f$ the filling time required to fill up the clutch cylinder with fluid and $T_b$ the build-up time.
Figure 2:
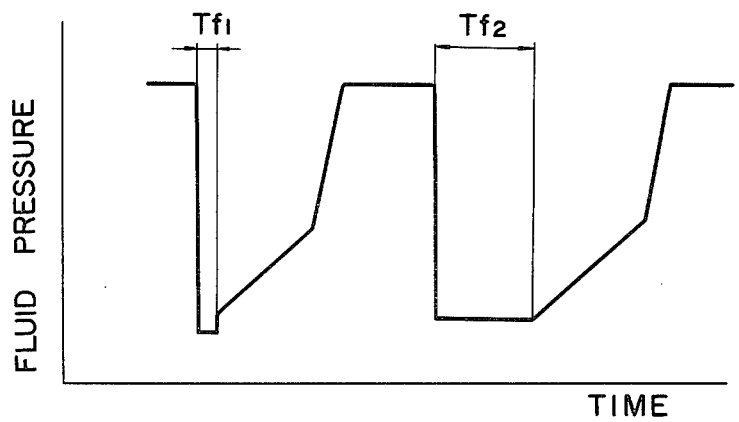
FIG. 2 is a diagram showing a relationship between fluid pressures at two different clutches having different filling times and time elapsed to engage each clutch.
Figure 3:
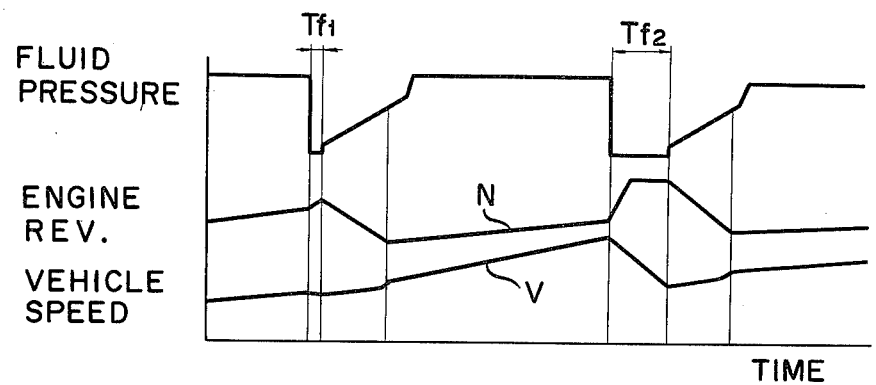
FIG. 3 is a diagram showing how engine revolution and vehicle speed are changed in accordance with fluid pressure changes at clutches having different filling times.
Figure 4:
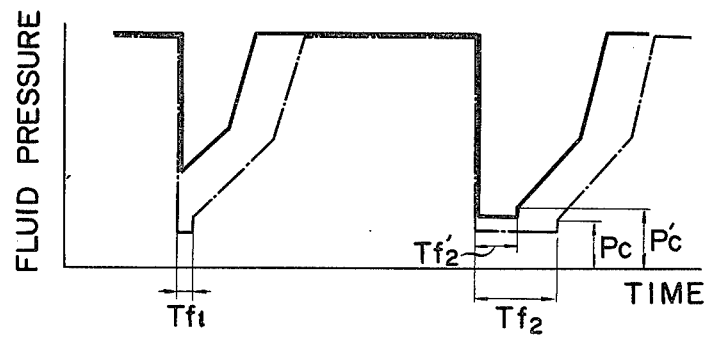
FIG. 4 is a diagram showing one of prior art techniques to shorten the filling time of a clutch having maximum filling time by increasing the initial clutch pressure from $P_c$ to $P_c'$ and its influence to other clutch having shorter filling time.
Figure 5:
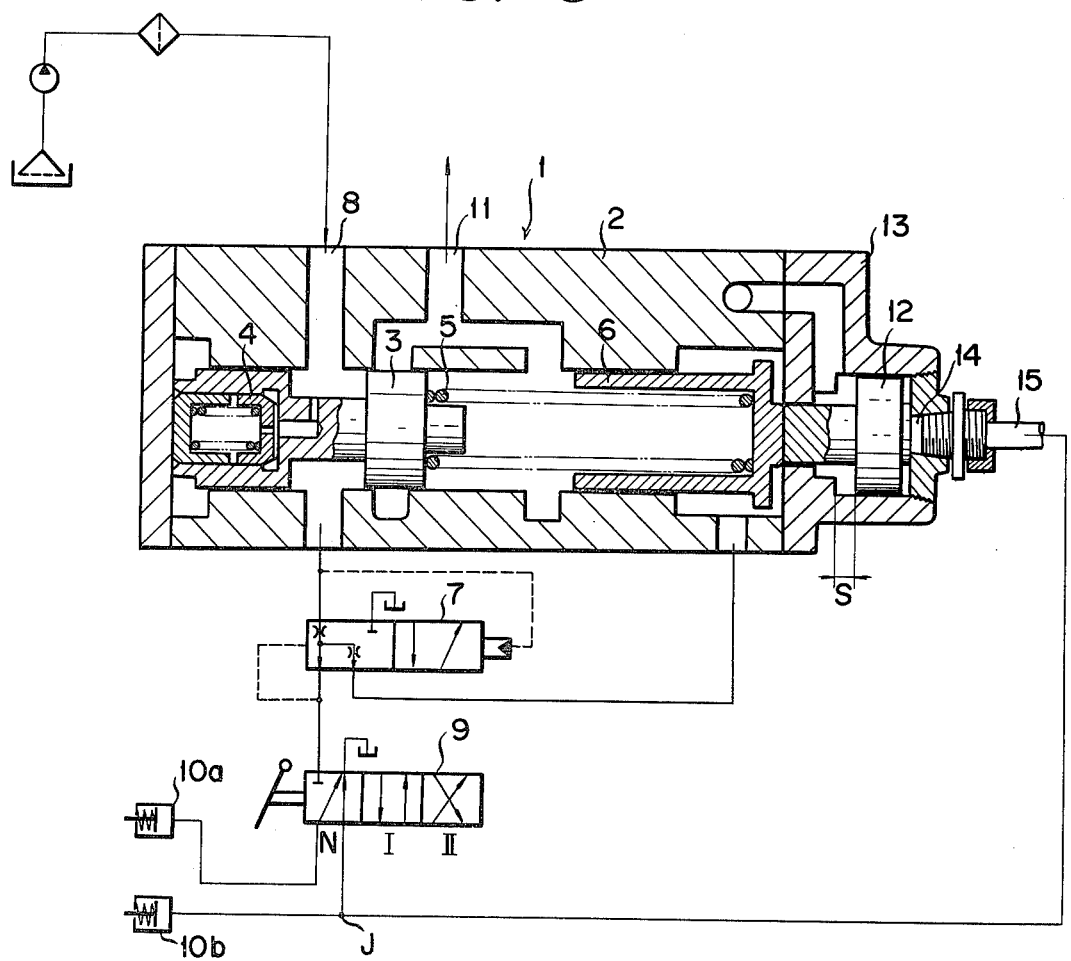
FIG. 5 is a pressure control system for a transmission according to the present invention wherein a modulation valve is shown in cross-section.

In FIG. 5, reference numeral 1 denotes a modulation valve, 2 a valve box thereof, 3 a spool, 4 a load piston, 5 a spring, 6 another load piston, and 7 a pilot-operated back pressure valve. When the fluid under pressure is supplied through an inlet port 8 and if a selector valve 9 is at its neutral position N and the circuits connected to clutches 10a and 10b are closed, the spool 3 is moved by the effect of the load piston 4 against the biasing force of the spring 5 thereby allowing the pressurized fluid which is introduced through the inlet port 8 to be directed to a lubricating port or drain port 11 (hereinafter referred to as the second outlet port).

When the selector valve 9 is changed over to a position I where the fluid is directed to the first clutch 10a, the fluid under pressure which is introduced through the inlet port 8 and the fast outlet port 16 is supplied into the cylinder of the first clutch 10a and fills it during the filling time of the clutch 10a. When the clutch cylinder has been filled with the pressurized fluid, the fluid pressure within the inlet port 8 will increase tending to move the spool 3 to drain the fluid through the second outlet port 11. However, at the same time, the back pressure valve 7 is actuated so as to exert a back pressure on the rear face of the load piston 6 to move the load piston 6 leftwards to increase the biasing force of the spring 5. As a result, the communication between the inlet port 8 and the lubricating port 11 is interrupted so that the fluid pressure at the first outlet port 16 will increase to the clutch actuating pressure $P_s$ keeping balance with the back pressure plus the biasing force of the spring 5.

The arrangement and effect of the above-mentioned modulation valve 1 are the same as those of conventional modulation valves.

Located on the side of the rear face of the load piston 6 of the modulation valve 1 within a cover 13 is an auxiliary piston 12. Connected to a chamber 14 formed on one side of the cylinder in which the piston 12 is slidably mounted is an auxiliary port 15 which is connected to the cylinder of the clutch 10b the filling time of which is longer than that of the clutch 10a.

In the above-mentioned arrangement, if the selector valve 9 is changed over to a position II thereby actuating the clutch 10b having a longer filling time, then a circuit pressure $P_b$ during filling of the clutch 10b is introduced into the auxiliary port 15 so as to move the auxiliary piston 12 leftwards by a stroke S and also move the load piston 6 leftwards by the same stroke S thereby increasing the biasing force of the spring 5. The circuit pressure $P_b$ during filling of the clutch 10b at a junction J of the main and auxiliary circuits can be given by the following formula.

$$P_b = \Delta P + P$$

Where P is the converted fluid pressure equivalent to the spring force for returning the piston and $\Delta P$ is the frictional resistance of the conduit extending from the junction J to the clutch 10b.

When the load piston 6 is moved leftwards, the biasing force of the spring 5 will increase, the pressure set by the spool 3 will increase, and the initial clutch pressure $P_c$ will also increase.

The pressure increase $\Delta P_c$ above the initial clutch pressure $P_c$ can be represented by the following formula.

$$\Delta P_c = KS/A_p$$

Where the spring constant of the spring 5 is K and the area of the load piston 4 subjected to a fluid pressure is $A_p$.

When the clutch 10a to which the above-mentioned auxiliary circuit is not connected is actuated, the initial clutch pressure $P_c$ is kept at a low value in the similar manner as in the case of the conventional system.

Since the present invention is constructed as mentioned hereinabove, the initial clutch pressure $P_c$ of a clutch having a longest filling time amoung the plurality of clutches can be increased so that the filling time of each of the clutches can be kept uniform and the aforementioned disadvantages such as racing of the engine and the reduction in the vehicle speed which might occur during speed changes can be eliminated. Further, according to the present invention, the above-mentioned function and effect can be obtained without impairing the modulation effect.

It is to be understood that the foregoing description is merely illustrative of a preferred embodiment of the present invention, and that the scope of the invention is not to be limited thereto, but is to be determined by the scope of the appended claims.

What I claim is:

1. In a pressure control system for a transmission including a plurality of fluid-actuated clutches which may be engaged and disengaged to obtain selected ones of a plurality of drive ratios, the combination comprising:

(a) a source of fluid under pressure;
   (b) a selector valve disposed between said source of fluid and said clutches for directing the fluid to selected ones thereof to shift between said drive ratios;
   (c) a modulation valve disposed at the flow-path between said source of fluid and said selector valve for modulating the pressure of fluid supplied to any of said clutches through said selector valve, said modulation valve comprising:
   a valve body having an axial bore formed therein, said valve body also having formed therein an inlet port connected with said source of fluid, a first outlet port connected with said clutches through said selector valve, a second outlet port and a back pressure port;
   a spool slidably mounted in said bore defining a first chamber at one end thereof, the first chamber being in constant communication with the inlet port;
   first biasing means for biasing said spool in a predetermined direction for establishing the communication between the inlet port and the second outlet port;
   second biasing means for biasing said spool in the opposite direction for blocking the communication between the inlet port and the second outlet port, said second biasing means being communicated with the back pressure port and operated by fluid introduced therethrough;
   a cover housing fitted to an end of said valve body opposite said spool, said cover housing having formed therein a second chamber and an auxiliary port connected with one of said clutches having a maximum fluid filling time; and
   a piston slidably mounted in said second chamber for biasing said second biasing means in the opposite direction when fluid is introduced into said second chamber through said auxiliary port; and
   (d) pilot-operated valve means disposed at the flow path between said modulation valve and said selector valve for introducing fluid into said back pressure port.

2. A pressure control system as recited in claim 1 wherein said first biasing means comprises a first load piston slidably mounted in said first chamber and wherein said second biasing means comprises a second load piston slidably mounted in said axial bore and a spring disposed between said spool and said second load piston.

3. A pressure control system as recited in claim 2 wherein one end of said piston is adapted to push said second load piston in the opposite direction when fluid is introduced into said second chamber.

* * * * *